United States Patent
Okada et al.

(10) Patent No.: US 7,678,192 B2
(45) Date of Patent: Mar. 16, 2010

(54) METHOD OF SOLIDIFYING AND DETOXIFYING SOIL, INCINERATED ASH AND COAL ASH AND METHOD OF DETOXIFYING POLLUTED WATER CONTAINING DIOXINS AND PCB

(76) Inventors: Kikuo Okada, 1-2-602, Tsurugaya 3-chome, Tagajo-shi, Miyagi 985-0841 (JP); Takeo Nishiura, 5-12-206, Terauchi 1-chome, Toyonaka-shi, Osaka 561-0872 (JP)

( * ) Notice: Subject to any disclaimer, the term of this patent is extended or adjusted under 35 U.S.C. 154(b) by 0 days.

(21) Appl. No.: 12/149,499

(22) Filed: May 2, 2008

(65) Prior Publication Data

US 2009/0272163 A1    Nov. 5, 2009

(51) Int. Cl.
  *C04B 7/00*   (2006.01)
  *C05B 17/00*  (2006.01)
  *B01J 20/00*  (2006.01)
(52) U.S. Cl. .............. 106/733; 106/606; 106/638; 106/690; 106/695; 106/713; 71/33; 71/63; 502/400
(58) Field of Classification Search .............. 502/400, 502/410; 71/33, 63; 106/606, 638, 658, 106/664, 690, 695, 713, 739, 733
See application file for complete search history.

(56) References Cited

U.S. PATENT DOCUMENTS

| 4,287,167 | A | * | 9/1981 | Aitcin ................... 423/331 |
| 5,346,546 | A | * | 9/1994 | Kaliski ................. 106/436 |
| 5,716,448 | A | * | 2/1998 | Furusawa et al. ....... 106/803 |
| 2005/0016421 | A1 | * | 1/2005 | Fujimori et al. ......... 106/691 |

* cited by examiner

*Primary Examiner*—Jerry Lorengo
*Assistant Examiner*—Carlos Barcena
(74) *Attorney, Agent, or Firm*—Oliff & Berridge, PLC

(57) ABSTRACT

A method of solidifying and detoxifying a soil, incinerated ash and coal ash to yield a solidified substance detoxified to a level complying with the environmental standards and a method of detoxifying polluted water containing dioxins and polluted water containing PCB are provided. First solidifying and detoxifying agent contains light burnt magnesite as component (1) and chrysolite powder as component (2), in which a ratio by weight of the component (1) and the component (2) is 1:5 to 5:1, preferably 1:3 to 3:1, more preferably 1:2 to 2:1 and is the solidifying and detoxifying agent applied to one kind selected from soil, incinerated ash and coal ash as well as polluted water containing dioxins and polluted water containing PCB. Other solidifying and detoxifying agent further contains as an additional component a fused phosphate fertilizer and titanium dioxide powder as well as anhydrous gypsum powder, light burnt dolomite and/or calcined lime powder.

13 Claims, No Drawings

METHOD OF SOLIDIFYING AND DETOXIFYING SOIL, INCINERATED ASH AND COAL ASH AND METHOD OF DETOXIFYING POLLUTED WATER CONTAINING DIOXINS AND PCB

FIELD OF THE INVENTION

The present invention relates to solidifying inorganic or organic soil, oil contaminated soil (including benzene), strongly acidic soil (including sulfur content), contaminated soil containing heavy metals, soil contaminated with dioxins, incinerated ash containing dioxins (including fly ash), coal ash, polluted water containing dioxins, polluted water containing polychlorobiphenyl (PCB) and the like and a solidifying and detoxifying method to apply a solidifying and detoxifying agent to the processed substance described above.

A solidified substance converted to particulates that is manufactured by the solidifying and detoxifying method of the present invention can be utilized as soil conditioner, reclaimed crushed stone and reclaimed crushed sand.

BACKGROUND OF THE INVENTION

Most of construction-related sludge (construction-related soil) produced as construction surplus soil in excavating work, dredging work and the like are transferred to a reclaimed land and the like to dispose as landfill. Among them, such soil regulated by a law for disposal as soil containing heavy metals such as chromium, cadmium and the like possibly discharged from tunneling work and the like or strongly acidic soil containing sulfur and the like is difficult to detoxify, so that at present it is filled in a pit, at bottom of which a water non-permeable sheet lies.

A cement-type solidifying agent is suitable for solidifying the inorganic soil (not containing polymer coagulants and the like), but has a high pH value and keeps a strong alkaline condition at pH 14 for a long hour exceeding a pH range of 3.5 to 10, at which an organism is habitable, so that utilization of the solidified substance obtained by such a solidifying agent is limited.

A lime-type solidifying agent is suitable to treat inorganic soil similarly to the cement-type solidifying agent, but causes a highly exothermic reaction in hydration reaction to generate a large volume of dust. The solidified substance obtained also has a high pH value similar to the cement and could not yield sufficient strength after solidification.

A gypsum-type solidifying agent has a low pH after solidification of the intended soil different from the cement-type and lime-type solidifying agents, so that the alkali-related pollution is difficult to take place but it could not produce sufficient strength after solidification.

Such solidifying agents have a common problem, in which when a hazardous substance is contained the intended soil, the hazardous component is suppressed to elute to some extent right after solidification, but an elutable hazardous component thereafter gradually elutes from the solidified substance and non-elution is thus difficult to maintain for an extended period of time. Improvement of a solidifying agent to solve such problems has been desired and development of a solidifying agent enabling to solidify any kind of soil fitting for the purpose as well as enabling to detoxify the hazardous substance and the like has been desired.

SUMMARY OF THE INVENTION

The present invention has a purpose to provide a solidifying and detoxifying agent which can convert soil, incinerated ash and coal ash to a solidified substance detoxified to a level to meet the environmental standards as well as a manufacture method of solidifying and detoxifying these processed substances using said solidifying and detoxifying agent to yield a solidified substance with effective use.

There are four types of the solidifying and detoxifying agent in the present invention to solve the problems described above as follows.

First solidifying and detoxifying agent of the present invention contains light burnt magnesite as component (1) and chrysolite powder as component (2), in which a ratio by weight of the component (1) to the component (2) is 1:5 to 5:1, preferably 1:3 to 3:1, more preferably 1:2 to 2:1 and is the solidifying and detoxifying agent to apply to one kind selected from soil, incinerated ash and coal ash.

First solidifying and detoxifying agent is suitable for solidifying and detoxifying treatment of the inorganic soil or organic soil.

Second solidifying and detoxifying agent of the present invention contains light burnt magnesite as component (1) and chrysolite powder as component (2), in which the component (2) is 1 to 60 parts by weight relative to 100 parts by weight of the component (1) and is the solidifying and detoxifying agent to apply to the inorganic soil or organic soil.

Third solidifying and detoxifying agent of the present invention contains light burnt magnesite as component (1), chrysolite powder as component (2) and anhydrous gypsum powder and/or calcined lime power as component (3), in which a ratio by weight of the component (1) to the component (2) is 1:5 to 5:1, preferably 1:3 to 3:1, more preferably 1:2 to 2:1 and the component (3) is 1 to 50 parts by weight, preferably 5 to 40 parts by weight, more preferably 5 to 30 parts by weight relative to 100 parts by weight of a sum of the component (1) and the component (2) and is the solidifying and detoxifying agent to apply to one kind selected from soil, incinerated ash and coal ash.

Third solidifying and detoxifying agent of the present invention is in particular suitable for use in solidifying and detoxifying the inorganic soil selected from the construction-related soil, river dredging-related soil, port and harbor dredging-related soil, water purification-related water sludge, strongly acidic soil, soil contaminated with mineral oils (for example, soil contaminated with mineral oils, preferably having 5% by weight or more of oil content) and the like and organic soils (soil containing organic substances, for example, sewage sludge, papermaking sludge, sludge produced from food manufacturing plant, soil contaminated with animal and vegetable oils (for example, soil contaminated with animal and vegetable oils, preferably having 5% by weight or more of oil content)).

Fourth solidifying and detoxifying agent of the present invention contains light burnt magnesite as component (1), chrysolite powder as component (2) and anhydrous gypsum powder as component (3) and both fused phosphate fertilizer and titanium dioxide power as component (4), in which a ratio by weight of the component (1) to the component (2) is 1:5 to 5:1, preferably 1:3 to 3:1, more preferably 1:2 to 2:1, and the component (3) is 1 to 60 parts by weight, preferably 5 to 50 parts by weight, more preferably 5 to 40 parts by weight relative to 100 parts by weight of a sum of the component (1)

and the component (2) and the component (4) is 1 to 100 parts by weight relative to 100 parts by weight of a sum of the component (1), the component (2) and the component (3) and is the solidifying and detoxifying agent to apply to one kind selected from soil, incinerated ash and coal ash.

Fourth solidifying and detoxifying agent of the present invention is in particular best suited to apply to one kind selected from the soil contaminated with heavy metals, soil contaminated with dioxins, general incinerated ash, incinerated ash containing dioxins and coal ash when component (4) contained is 60 to 100 parts by weight.

To solve the problems described above, a solidifying and detoxifying method of the present invention comprises the features of, (1) mixing 1000 kg of one kind of a processed substance selected from the soils after adjusting a water content to 60 to 80% by weight with 50 to 200 kg of the first, second, third or fourth solidifying and detoxifying agent of the present invention described above or adjusting a water content of one kind of the processed substance selected from the incinerated ash or coal ash to 60 to 80% by weight and mixing 50 to 200 kg of the first, second, third or fourth solidifying and detoxifying agent relative to 1 $m^3$ of said processed substance, (2) kneading to yield a kneaded product in a form of slurry and (3) drying naturally or forcefully said kneaded product to yield a solidified product converted to particulates.

When the first or second solidifying and detoxifying agent described above is applied among the solidifying and detoxifying agent, it is suitable as a method of solidifying and detoxifying the inorganic soil, organic soil and oil contaminated soil (including benzene) (for example, soil containing below 5% by weight of oil content contaminated with mineral oil or organic oil) and said method can yield a reclaimed crushed sand and a soil conditioner as particulates.

When the third solidifying and detoxifying agent described above is applied, a solidifying and detoxifying method of the present invention preferably comprises the features in particular of, (I) mixing 50 to 300 kg of the second solidifying and detoxifying agent described above in the present invention relative to 1000 kg of one kind of processed substances selected from the construction-related soil, river dredging-related soil, port and harbor dredging-related soil, water purification-related sludge and strongly acidic soil after adjusting a water content to 60 to 80% by weight, (2) kneading to yield a kneaded product in a form of slurry and (3) drying naturally or forcefully said kneaded product to yield a reclaimed crushed sand or reclaimed crushed stone. Said solidifying and detoxifying method is in particular suitable as a method of solidifying and detoxifying the inorganic soil selected from the construction-related soil, river dredging-related soil, port and harbor dredging-related soil, water purification-related sludge, strongly acidic soil, inorganic soil contaminated with oil (for example, inorganic soil contaminated with mineral oils, preferably with 5% by weight or more of oil content) and the like and the organic soil (soil containing organic substances, for example, sewage sludge, papermaking sludge, sludge produced from food manufacturing plant, soil contaminated with organic oil (for example, soil contaminated with organic oil, preferably with 5% by weight or more of oil content)).

When the fourth solidifying and detoxifying agent described above is applied, the solidifying and detoxifying method of the present invention is suitable as a method of solidifying and detoxifying the soil contaminated with heavy metals, soil contaminated with dioxins, general incinerated ash (including fly ash), incinerated ash containing dioxins and coal ash.

When 10 to 30 parts by weight of component (3) are in particular used relative to 100 parts by weight of a sum of component (1) and component (2) in the fourth solidifying and detoxifying agent described above, it is suitable to process the strongly acidic soil for solidification and detoxification and the solidifying and detoxifying method of the present invention using said solidifying and detoxifying agent comprises the features of, (1) mixing 50 to 500 kg of said solidifying and detoxifying agent with 1,000 kg of the strongly acidic soil after adjusting a water content to 60 to 80% by weight, (2) kneading to yield a kneaded product in a form of slurry and (3) drying naturally or forcefully said kneaded product to yield a reclaimed crushed sand or soil conditioner.

When 60 to 100 parts by weight of component (4) are used relative to 100 parts by weight of a sum of component (1), component (2) and component (3) in the fourth solidifying and detoxifying agent described above, it is suitable to solidify and detoxify the soil contaminated with heavy metals and soil contaminated with dioxins by mixing with 50 to 500 kg of said solidifying and detoxifying agent and the solidifying and detoxifying method of the present invention using said solidifying and detoxifying agent comprises the features of, (1) mixing 50 to 500 kg of said solidifying and detoxifying agent with 1,000 kg of one kind of the processed substances selected from the soil contaminated with heavy metals and soil contaminated with dioxins after adjusting a water content to 60 to 80%, or adjusting a water content of one kind of the processed substances selected from the incinerated ash containing dioxins and general incinerated ash to 60 to 80% by weight and mixing 50 to 300 kg of said solidifying and detoxifying agent relative to 1 $m^3$ of a dried product of said processed substance, (2) kneading to yield a kneaded product in a form of slurry and (3) drying naturally or forcefully said kneaded product to yield a reclaimed crushed sand or soil conditioner.

A solidifying and detoxifying method of the present invention can yield a slurry form of a mixture, which is dried naturally or forcefully allowing the kneaded product in a form of slurry to naturally initiate congelation after 30 minutes (in case of 20° C.) by itself and complete the congelation in a range of 2 to 3 hours, forming a congealed product with cement-like hardness after 3 to 6 days.

A congealing time, when the solidifying and detoxifying method of the present invention is applied to the processed substance varies widely depending on the properties of the processed substance mixing with the solidifying and detoxifying agent. It is believed that what happened herein is caused by extensive involvement of a grain size and a specific surface area particulates obtained and adsorption of a magnesium ion in congelation and solidification, when the solidifying and detoxifying agent reacts with an iron content or organic substance contained in the processed substance or may react with aluminum silicate such as allophone, montmorillonite and the like due to high quality.

The particulates obtained become a substance to prevent or inhibit the organic substance from elution. While mechanism of preventing or inhibiting the organic substance from elution is not clear, it is probably believed that the reactions of each component shown below involved to the solidification integrally occur with the components of the processed substance, forming extremely hard particulates. The particulates obtained by the solidifying and detoxifying method of the present invention is weakly alkaline at pH of 8.5 to 9.0 and complies with the environmental standards of Official Notice 46 from the Japanese Ministry of the Environment, which regulates the elution components.

Adjusting a composition of the solidifying and detoxifying agent allows varying a particle diameter of the particulates obtained by the solidifying and detoxifying method of the present invention, yielding the solidified substance with various particle diameters. For example, when an amount of chrysolite is reduced or it is not added at all, a particle diameter becomes smaller. When an amount of light burnt magnesite is low, a particle diameter becomes smaller. On the other hand, when an amount of a fused phosphate fertilizer is increased, strength is increased and the particle diameter becomes larger.

The particulates are thus extremely hard and detoxified to a level complying with the environmental standards of Official Notice 46 from the Japanese Ministry of the Environment as described above. The processed substance, to which the solidifying and detoxifying agent of the present invention is applied, forms a granular solidified substance with hardness of 3H to 6H and durable strength. Said solidified substance has the uniaxial compressive strength of 50 KN or more, so that it conforms the physical properties and grain size of the crushed sand for concrete defined by JIS A5004 and can be used as reclaimed crushed sand, for example, enabling to recycle as a roadbed material and the like.

"Soil" in the present specification means earth, sludge and/or crushed stone powder and earth and sand.

"Organic soil" in the present specification means the soil containing the organic substance, for example, including the soil contaminated with organic oil.

"Detoxification" in the present specification means the hazardous components in the solidified substance obtained are detoxified or not eluted as a nonhazardous substance, thus enabling its level to confine within a range of various standards (environmental standards and reclamation standards of the soil and the like).

"Inorganic soil" in the present specification means the soil containing only a negligible level of or no organic substance. Generally it includes the dirt produced at construction and civil engineering sites and the sludge precipitated at a water treatment plant.

"Light burnt magnesite" used as one component of the solidifying and detoxifying agent in the present invention is a product produced by calcinating magnesite ($MgCO_3$) in a coal gasification furnace and the like at about 800 to 1100° C. for 4 to 5 hours (that is, light burning) to remove carbon dioxide to convert magnesium oxide (MgO).

"Chrysolite powder" used as one component of the solidifying and detoxifying agent in the present invention is a product of bonding silicon dioxide ($SiO_2$) with magnesium oxide (MgO), that is, composed of magnesium silicate ($MgO \cdot SiO_2$) as a main component and has a grain size adjusted to a 10% particle diameter (36 mm), a 50% particle diameter (113 mm) and a 90% particle diameter (447 mm) from chrysolite (periodite).

Contacting both light burnt magnesite and chrysolite powder with water causes the reaction of magnesium oxide with water to produce magnesium hydroxide (formula 1). Magnesium hydroxide reacts at this time with carbon dioxide in the air to form magnesium carbonate (formula 2).

$$MgO+H_2O \rightarrow Mg(OH)_2 \quad \text{(Formula 1)}$$

$$Mg(OH)_2+CO_2 \rightarrow MgCO_3+H_2O \quad \text{(Formula 2)}$$

When light burnt magnesite and chrysolite powder are kneaded with the soil containing moisture, magnesium oxide (MgO) in these ores is considered to cause the reactions according to the formula (1) and the formula (2), forming a solidified substance with high strength.

In addition to these reactions, it is believed that the components in the solidifying and detoxifying agent react with various components in the processed substance such as the inorganic carbonate compounds, water soluble organic substances, silicates, iron salts, hydrocarbons formed from a carbon atom and a hydrogen atom as a main component of a crude oil and the like to form with various components in the soil the solidified substance having high strength without elution.

In addition to these reactions, chrysolite powder and gypsum powder contained in the component of the solidifying and detoxifying agent further add the strength to the solidified substance. That is, silica ($SiO_2$) contained in chrysolite powder reacts with a calcium ion and/or aluminum in the composition system forming the solidified substance to produce a calcium silicate hydrate, calcium aluminate hydrate and the like, solidifying the soil particle to enhance expression of the strength.

Furthermore this time, when phosphoric acid is present by addition of a fused phosphate fertilizer and the like, magnesium phosphate is considered to be produced according to the reaction shown in the following formula (3).

$$MgO+nH_2O \rightarrow Mg(OH)_2+H_3PO_4 \rightarrow Mg_3(PO_4)_2 \cdot 8H_2O \quad \text{(Formula 3)}$$

The hydroxides (including dioxins) in a form of slurry produced by the reaction with moisture is replaced by an ion exchange reaction with a layered silicate clay mineral and the like (chrysolite powder, fused phosphate fertilizer and the like) to be adsorbed between the layers, in which only adsorbed substances are selectively decomposed and detoxified. Titanium dioxide ($TiO_2$) contained in the solidifying and detoxifying agent also synergistically serves as a photocatalyst to decompose by dechlorination and the like.

One example of the value of component analysis (% by weight) for general light burnt magnesite is shown below.

| | |
|---|---|
| MgO | 90.79% |
| CaO | 2.58% |
| $SiO_2$ | 1.99% |
| $Fe_2O_3$ | 0.63% |
| $Al_2O_3$ | 0.21% |
| Loss on ignition | 3.80% |

One example of the value of component analysis (% by weight) for general chrysolite powder is shown below.

| | |
|---|---|
| $SiO_2$ | 45.79% |
| $TiO_2$ | 0.02% |
| $Al_2O_3$ | 1.31% |
| $Fe_2O_3$ | 5.67% |
| MgO | 46.17% |
| CaO | 0.86% |
| MnO | 0.18% |

One example of the value of component analysis (% by weight) for a general fused phosphate fertilizer is shown below.

| | |
|---|---|
| Citric acid soluble phosphoric acid | 20% |
| Calcium oxide | 35% |
| Magnesium oxide | 20% |
| Citric acid soluble magnesium | 10% |
| Acid soluble silisic acid | 15% |

One example of the value of component analysis (% by weight) for general titanium dioxide powder is shown below.

| | |
|---|---|
| $TiO_2$ | 86.5% |
| $SiO_2$ | 1.20% |
| MgO | 0.30% |
| CaO | 8.12% |
| $Fe_2O_3$ | 0.30% |
| $Al_2O_3$ | 1.10% |
| $SiO_2$ | 1.20% |
| $P_2O_5$ | 0.23% |
| MnO | 0.03% |
| Loss on ignition | 1.02% |

One example of the value of component analysis (% by weight) for general light burnt dolomite is shown below.

| | |
|---|---|
| $SiO_2$ | 1.704% |
| $Fe_2O_3$ | 0.471% |
| $Al_2O_3$ | 0.163% |
| CaO | 56.38% |
| MgO | 39.27% |
| $P_2O_5$ | 0.018% |
| Loss on ignition | 1.994% |

One example of the value of component analysis (% by weight) for general anhydrous gypsum powder is shown below.

| | |
|---|---|
| CaO | 40.98% |
| $SiO_2$ | 0.36% |
| $Al_2O_3$ | 0.14% |
| $Fe_2O_3$ | 0.09% |
| $K_2O$ | 0.27% |
| $SO_3$ | 52.97% |
| Loss on ignition | 5.19% |

One example of the value of component analysis (% by weight) for general calcined lime powder is shown below.

| | |
|---|---|
| CaO | 95.69% |
| $SiO_2$ | 1.03% |
| MgO | 0.66% |
| $Fe_2O_3$ | 0.06% |
| $Al_2O_3$ | 0.08% |
| Loss on ignition | 4.13% |

DETAILED DESCRIPTION OF THE PREFERRED EMBODIMENT

Preferred embodiments for treatment of various processed substances are illustrated below, but the present invention is not limited by the following examples.

Solidifying and Detoxifying Treatment of Organic Sludge (Sewage Sludge) (in Case of Yielding Reclaimed Crushed Sand)

Ten to twenty parts by weight of the solidifying and detoxifying agent consisting of light burnt magnesite and chrysolite powder in a ratio by weight of 1.0:0.1-0.6 are added to 100 parts by weight of a sewage sludge produced at construction site after adjusting a water content to 85% or less to knead in a mixer for 2 to 3 minutes to yield a slurry. The slurry is immediately discharged from the mixer to leave to stand on a flat surface. In initiating solidification by the hydration reaction, congelation starts at ambient temperature (in case of about 20° C.) after about 30 minutes and completes after about 180 minutes. The congealed product is further left to stand yielding a granular solidified substance with good strength after 3 to 6 days. This is sieved by a particle classifier and the like to manufacture a product such as a roadbed material (fine aggregate with a particle diameter under 5 mm) and the like.

Solidifying and Detoxifying Treatment of Construction-Related Sludge (Including Soil Containing Bentonite and the Like and Dredged-Related Sludge) for Inorganic Soil Ten to twenty parts by weight of the solidifying and detoxifying agent comprising as an essential constituent comprising light burnt magnesite and chrysolite powder (weight ratio of 1:5 to 5:1) (referred to as main reactive component) and light burnt dolomite (1 to 50 parts by weight relative to 100 parts by weight of the main reactive component) are added to 100 parts by weight of the sludge produced at construction site after adjusting a water content to 60 to 70%, to knead in a mixer for 2 to 3 minutes to yield a slurry. The slurry is immediately discharged from the mixer to leave to stand on a flat surface. In initiating solidification by the hydration reaction, congelation starts at ambient temperature (in case of about 20° C.) after about 30 minutes and completes after about 180 minutes.

The congealed product is further left to stand yielding a granular solidified substance with good strength after 3 to 6 days.

This is sieved by a particle classifier and the like to manufacture a product such as a soil conditioner, a roadbed material (fine aggregate with a particle diameter under 5 mm) and the like.

Solidifying and Detoxifying Treatment of Organic Sludge and the Like Containing 5% or More of Animal and Vegetable Oils from Food Processing for Organic Soil Ten to twenty parts by weight of the solidifying and detoxifying agent comprising as an essential constituent comprising light burnt magnesite and chrysolite powder (weight ratio of 1:5 to 5:1) (referred to as main reactive component) and light burnt dolomite (1 to 60 parts by weight relative to 100 parts by weight of the main reactive component) are added to 100 parts by weight of a sludge containing 10% by weight of animal and vegetable oils after adjusting a water content to 85% or less, to knead in a mixer for 2 to 3 minutes to yield a slurry. The slurry is immediately discharged from the mixer to leave to stand on a flat surface. In initiating solidification by the hydration reaction, congelation starts at ambient temperature (in case of about 20° C.) after about 30 minutes and completes after about 180 minutes. The concealed product is further left to stand yielding a granular solidified substance with good strength after 3 to 6 days.

This is sieved by a particle classifier and the like to manufacture a product such as a soil conditioner, a roadbed material (fine aggregate with a particle diameter under 5 mm) and the like.

When the organic sludge contains animal and vegetable oils below 5%, an amount of light burnt dolomite can be reduced.

Solidifying and Detoxifying Treatment of Soil Contaminated with Mineral Oil (Soil Containing 5% by Weight or More of Mineral Oil)

Ten to twenty parts by weight of the solidifying and detoxifying agent comprising as an essential constituent light burnt magnesite and chrysolite powder (weight ratio of 1:5 to 5:1) (referred to as main reactive component) and calcined lime powder (1 to 60 parts by weight relative to 100 parts by weight of the main reactive component) are added to 100 parts by weight of a contaminated soil containing 10% by weight of mineral oil after adjusting a water content to 85% or less, to knead in a mixer for 2 to 3 minutes to yield a slurry. The slurry is immediately discharged from the mixer to leave to stand on a flat surface. In initiating solidification by the hydration reaction, congelation starts at ambient temperature (in case of about 20° C.) after about 30 minutes and completes after about 180 minutes. The congealed product is further left to stand yielding a granular solidified substance with good strength after 3 to 6 days.

This is sieved by a particle classifier and the like to manufacture a product such as a soil conditioner, a roadbed material (fine aggregate with a particle diameter under 5 mm) and the like. The product can be returned to a site to reclaim.

When the sludge contains mineral oil below 5% by weight, an amount of calcined lime powder can be reduced.

Solidifying and Detoxifying Treatment of Incinerated Ash Containing Dioxins

After adjusting a water content of an incinerated ash containing dioxins to 60 to 80% by weight, 50 to 200 kg of a solidifying and detoxifying agent with the following composition is added relative to 1 m³ of the dried product of said processed substance. The composition of the solidifying and detoxifying agent contains light burnt magnesite, chrysolite powder and titanium dioxide powder and a fused phosphate fertilizer, in which an amount of titanium dioxide powder is 1 to 50 parts by weight relative to 100 parts by weight of a sum of light burnt magnesite and chrysolite powder (weight ratio, 1:5 to 5:1) (referred to as a main reactive component) and a fused phosphate fertilizer (1 to 50 parts by weight relative to 100 parts by weight of main reactive component).

The mixture is then kneaded in a mixer for 2 to 3 minutes to yield slurry. The slurry is immediately discharged from the mixer to leave to stand on a flat surface. In initiating solidification by the hydration reaction, congelation starts at ambient temperature (in case of about 20° C.) after about 30 minutes and completes after about 180 minutes. The congealed product is further left to stand yielding a granular solidified substance with good strength after 3 to 6 days. This is sieved by a particle classifier and the like to manufacture a product such as a soil conditioner, a roadbed material (fine aggregate with a particle diameter under 5 mm) and the like.

Solidifying and Detoxifying Treatment of Coal Ash

A water content of a coal ash is adjusted to 60 to 80% by weight and 50 to 200 kg of the solidifying and detoxifying agent with the following composition is mixed relative to 1 m³ of said processed substance. The solidifying and detoxifying agent applied to the coal ash has an essential constituent comprising light weight magnesite and chrysolite powder (weight ratio of 1:5 to 5:1) (referred to as a main reactive component) and anhydrous gypsum powder (1 to 50 parts by weight relative to 100 parts by weight of main reactive component), in which a fused phosphate fertilizer (1 to 100 parts by weight) is further added to said essential constituent (100 parts by weight). The mixture is then kneaded in a mixer for 2 to 3 minutes to yield slurry. The slurry is immediately discharged from the mixer to leave to stand on a flat surface. In initiating solidification by the hydration reaction, congelation starts at ambient temperature (in case of about 20° C.) after about 30 minutes and completes after about 180 minutes. The congealed product is further left to stand yielding a granular solidified substance with good strength after 3 to 6 days. This is sieved by a particle classifier and the like to manufacture a product such as a soil conditioner, a roadbed material (fine aggregate with a particle diameter under 5 mm) and the like.

Solidifying and Detoxifying Treatment of Hot Spring Soil as Strongly Acidic Soil Ten to thirty parts by weight of the solidifying and detoxifying agent comprising as an essential constituent comprising light burnt magnesite and chrysolite powder (weight ratio of 1:5 to 5:1) (referred to as a main reactive component) and light burnt dolomite or anhydrous gypsum powder (1 to 50 parts by weight relative to 100 parts by weight of the main reactive component), to which a fused phosphate fertilizer (1 to 100 parts by weight) is added to the essential constituent (100 parts by weight) are added to 100 parts by weight of strongly acidic hot spring soil containing a sulfur content after adjusting a water content to 85% or less to knead in a mixer for 2 to 3 minutes to yield a slurry. The slurry is immediately discharged from the mixer to leave to stand on a flat surface. In initiating solidification by the hydration reaction, congelation starts at ambient temperature (in case of about 20° C.) after about 30 minutes and completes after about 180 minutes.

The congealed product is further left to stand yielding a granular solidified substance with good strength after 3 to 6 days.

This is sieved by a particle classifier and the like to manufacture a product such as a soil conditioner, a roadbed material (fine aggregate with a particle diameter under 5 mm) and the like.

Detoxifying Treatment of Contaminated Water Containing Dioxins

One to three percents of a detoxifying agent with the following composition is added relative to 1000 l of contaminated water containing dioxins.

The composition of a detoxifying agent applied to the contaminated water containing dioxins contains light burnt magnesite, chrysolite powder, a fused phosphate fertilizer, titanium dioxide powder and light burnt dolomite, in which 1 to 30 parts by weight of light burnt dolomite is contained relative to 100 parts by weight of a sum of light burnt magnesite, chrysolite powder (weight ratio of 1:5 to 5:1) (referred to as a main reactive component), a fused phosphate fertilizer (1 to 50 parts by weight relative to 100 parts by weight of the main reactive component) and titanium dioxide powder (1 to 30 parts by weight relative to 100 parts by weight of the main reactive component).

The mixture is then stirred in a tank for 3 minutes to yield a flocculate (precipitate). This is filtered to separate into a filtered product (precipitate after treatment) and filtered water (water after treatment and separation). The filtered product is further cured to yield a reclamation material (for soil covering) with good compaction after 3 days.

Detoxifying Treatment of Contaminated Water Containing PCB

One to three percents of a detoxifying agent with the following composition is added relative to 1,000 l of contaminated water containing PCB. The composition of a detoxifying agent applied to the contaminated water containing PCB contains light burnt magnesite, chrysolite powder, a fused phosphate fertilizer, titanium dioxide powder, light burnt dolomite and calcined lime powder, in which 1 to 30 parts by weight of calcined lime is contained relative to 100 parts by weight of a sum of light burnt magnesite and chrysolite powder (weight ratio of 1:5 to 5:1) (referred to as a main reactive component), a fused phosphate fertilizer (1 to 50 parts by weight relative to 100 parts by weight of the main reactive component), titanium dioxide powder (1 to 30 parts by weight relative to 100 parts by weight of the main reactive component) and light burnt dolomite (1 to 30 parts by weight relative to 100 parts by weight of the main reactive component).

The mixture is then stirred in a tank for 3 minutes to yield a flocculate (precipitate). This is filtered to separate into a filtered product (precipitate after treatment) and filtered water (water after treatment and separation). The filtered product is further cured to yield a reclamation material (for soil covering) with good compaction after 3 days.

EXAMPLES

Example 1

Solidifying and Detoxifying Treatment of Construction-Related Sludge (Including Dredging-Related Sludge)

One hundred fifty kg of a solidifying and detoxifying agent consisting of light burnt magnesite (40% by weight) (made by Sobue Clay Co., Ltd.), chrysolite powder (40% by weight) (Miyamori Saiseki Industry Co., Ltd.) and anhydrous gypsum powder (20% by weight) (made by Sobue Clay Co., Ltd.) were added to 1,000 kg of a sludge discharged from a construction site after adjusting a water content to 85% or less, to knead in a mixer for 3 minutes to yield a slurry. The slurry was immediately discharged from the mixer to leave to stand on a flat surface. Congelation was completed after about 180 minutes at ambient temperature (about 20° C.). The congealed product was further left to stand to yield a granular solidified substance with good strength after 3 days. This was sieved by a particle classifier and the like to yield a soil conditioner and a roadbed material (fine aggregate with grain size below 5 mm).

Table 1 below shows a change of the concentration in cadmium, lead and arsine before and after treatment of solidifying and detoxifying the sludge discharged from a construction site.

TABLE 1

| Measured Object | Before Treatment (mg/L) | After Treatment (mg/L) | Measurement Method |
|---|---|---|---|
| Cadmium | 0.03 | Below 0.002 | JIS K 0102 55 |
| Lead | 0.03 | Below 0.01 | JIS K 0102 54 |
| Arsine | 0.01 | Below 0.005 | JIS K 0102 61.2 |

Example 2

Solidifying and Detoxifying Treatment of Organic Sludge Containing 10% Animal and Vegetable Oil and the Like Ten kg of a solidifying and detoxifying agent consisting of light burnt magnesite (40% by weight) (made by Sobue Clay Co., Ltd.), chrysolite powder (40% by weight) (Miyamori Saiseki Industry Co., Ltd.) and calcined lime powder (20% by weight) (made by Tohoku Tosoh Chemical Co., Ltd.) was added to 50 kg of a sludge containing 10% by weight of animal and vegetable oils after adjusting a water content to 85% or less, to knead in a mixer for 3 minutes to yield a slurry. The slurry was immediately discharged from the mixer to leave to stand on a flat surface. Congelation was completed after about 180 minutes at ambient temperature (about 20° C.). The congealed product was further left to stand yielding a granular solidified substance with good strength after 3 days. This was sieved by a particle classifier and the like to yield a soil conditioner and a roadbed material (fine aggregate with grain size below 5 mm).

Example 3

Solidifying and Detoxifying Treatment of Soil Contaminated with Mineral Oils (Including Benzene)

One hundred kg of a solidifying and detoxifying agent with the following composition was mixed with 1000 kg of an oil-contaminated soil containing mineral oils after adjusting a water content to 65 to 85%.

Composition of Solidifying and Detoxifying Agent

| (1) | Light burnt magnesite (made by Sobue Clay Co., Ltd.) | 30% by weight |
| (2) | Chrysolite powder (made by Miyamori Saiseki Industry Co., Ltd.) | 20% by weight |
| (3) | Calcined lime powder (made by Tohoku Tosoh Chemical Co., Ltd.) | 50% by weight |

The mixture was then kneaded in a mixer for 3 minutes to yield a slurry (water content, in the vicinity of 30%). The slurry was immediately discharged from the mixer to leave to stand on a flat surface. The congealed product was cured at ambient temperature (in case of 20° C.) after about 30 minutes to yield a granular solidified substance with good strength after 3 days. This was sieved by a particle classifier to yield a soil conditioner or landfill material.

Table 2 below shows the analytical results on the concentration of oil content and the amount of benzene eluted before and after solidifying and detoxifying treatment.

TABLE 2

| | Analysis data | | | |
|---|---|---|---|---|
| | Oil content (mg/kg) | | Benzene (mg/l) | |
| Name of block | Before treatment | After treatment | Before treatment | After treatment |
| No 1-2 | 4,200 | 280 | 0.012 | Below 0.001 |
| No 2-1 | 2,200 | 300 | 0.015 | Below 0.001 |
| No 3-1 | 2,800 | 670 | 0.015 | Below 0.001 |

Example 4

Solidifying and Detoxifying Treatment of Soil Contaminated with Mineral Oils (Soil Containing 1% by Weight of Mineral Oils)

Ten kg of a solidifying and detoxifying agent containing as an essential constituent 20% by weight of light burnt magnesite (made by Sobue Clay Co., Ltd), 20% by weight of chrysolite powder (made by Miyamori Saiseki Industry Co., Ltd.) and 60% by weight of calcined lime powder (made by Tohoku Tosoh Chemical Co., Ltd.) were added to 50 kg of an oil contaminated soil containing 1% by weight of mineral oils (10,000 mg/l) after adjusting a water content to 85% or less, to knead in a mixer for 3 minutes to yield a slurry. The slurry was immediately discharged from the mixer to leave to stand on a flat surface. Congelation initiated after about 30 minutes at ambient temperature (in case of 20° C.) and completed after about 180 minutes. The congealed product was further left to stand yielding a granular solidified substance with good strength after 3 days. A content of the mineral oils in the granular solidified substance obtained was determined to give 13 mg/l. This value complies with the environmental standards of Official Notice No. 3, 1976 prepared by the Japanese Ministry of the Environment in Japan.

The granular solidified substance obtained was sieved by a particle classifier and the like to yield a soil conditioner and a roadbed material (fine aggregate with a particle diameter below 5 mm).

Example 5

Solidifying and Detoxifying Treatment of Mixed Ash of Incinerated Ash Containing Dioxin and Fly Ash Forty kg of a solidifying and detoxifying agent with the following composition were added to a mixed ash comprising an incinerated ash containing dioxin-related compounds (dioxin and dibenzofuran) and coplanar PCBs and a fly ash after adjusting a water content to 85% or less relative to 0.2 m$^3$ of the dried substance.

Composition of Solidifying and Detoxifying Agent

| | |
|---|---|
| Light burnt magnesite (made by Sobue Clay Co., Ltd.) | 20% by weight |
| Chrysolite powder (made by Miyamori Saiseki Industry Co., Ltd.) | 20% by weight |
| Fused phosphate fertilizer (made by Tohoku Tosoh Chemical Co., Ltd.) | 50% by weight |
| Titanium dioxide powder (Sobue Clay Co., Ltd.) | 10% by weight |

The mixture was then kneaded in a mixer for 3 minutes to yield a slurry. The slurry was immediately discharged from the mixer to leave to stand on a flat surface. Congelation initiated after about 30 minutes at ambient temperature (in case of about 20° C.) and completed after about 180 minutes. The congealed product was further left to stand to yield a granular solidified substance with good strength after 3 days. This was sieved by a particle classifier to yield a roadbed material (fine aggregate with a particle diameter below 5 mm).

Table 3 below shows a change of the toxicity equivalent concentration (TEQ) in a sum of the dioxins (dioxin and dibenzofuran) and coplanar PCBs before and after the solidifying and detoxifying treatment.

Example 6

Solidifying and Detoxifying Treatment of Coal Ash

Ten kg of a solidifying and detoxifying agent with the following composition was mixed with a coal ash after adjusting a water content to a range of 85% relative to 0.05 m$^3$ of the dried substance of coal ash.

| | |
|---|---|
| Light burnt magnesite (made by Sobue Clay Co., Ltd.) | 40% by weight |
| Chrysolite powder (made by Miyamori Saiseki Industry Co., Ltd.) | 40% by weight |
| Anhydrous gypsum powder (made by Sobue Clay Co., Ltd.) | 20% by weight |

The mixture was then kneaded in a mixer for 3 minutes to yield a slurry. The slurry was immediately discharged from the mixer to leave to stand on a flat surface. Congelation initiated after about 30 minutes at ambient temperature (in case of about 20° C.) and completed after about 180 minutes. The congealed product was further left to stand to yield a granular solidified substance with good strength after 3 days. This was sieved by a particle classifier to yield a roadbed material.

Example 7

Solidifying and Detoxifying Treatment of Hot Spring Soil as a Model of Strongly Acidic Soil Ten kg of a solidifying and detoxifying agent with the following composition were mixed with 50 kg of a hot spring soil exhibiting strong acidity after adjusting a water content to 85% or less.

Composition of Solidifying and Detoxifying Agent

| | |
|---|---|
| Light burnt magnesite (made by Sobue Clay Co., Ltd.) | 30% by weight |
| Chrysolite powder (made by Miyamori Saiseki Industry Co., Ltd.) | 30% by weight |
| Light burnt dolomite (made by Sobue Clay Co., Ltd.) | 20% by weight |
| Fused phosphate fertilizer (made by Tohoku Tosoh Chemical Co., Ltd.) | 20% by weight |

The mixture was then kneaded in a mixer for 3 minutes to yield a slurry. The slurry was immediately discharged from the mixer to leave to stand on a flat surface. Congelation initiated after about 30 minutes at ambient temperature (in case of about 20° C.) and completed after about 180 minutes. The congealed product was further left to stand to yield a granular solidified substance with good strength after 3 days.

TABLE 3

| Measurement object | Before treatment | After treatment | Measurement method |
|---|---|---|---|
| Total concentration of dioxins and coplanar PCBs actually measured | 146.62 ng/g | 15 ng/g | Official Notice No. 6 from the Japanese Ministry of the Health and Welfare |
| Total toxicity equivalent concentration of dioxins and coplanar PCBs | 8.70 ng-TEQ/g | 0.28 ng-TEQ/g | Official Notice No. 6 from the Japanese Ministry of the Health and Welfare |

Example 8

Solidifying and Detoxifying Treatment of Sewage Sludge (Incinerated Ash)

Fifty kg of a sewage sludge (incinerated ash) were adjusted a water content to a range of 60 to 70%, and mixed with 10 kg of a solidifying and detoxifying agent with the following composition.

Composition of Solidifying and Detoxifying Agent

| | |
|---|---|
| Light burnt magnesite (made by Sobue Clay Co., Ltd.) | 40% by weight |
| Chrysolite powder (made by Miyamori Saiseki Industry Co., Ltd.) | 40% by weight |
| Anhydrous gypsum powder (made by Sobue Clay Co., Ltd.) | 20% by weight |

The mixture was then kneaded in a mixer for 3 minutes to yield a slurry. The slurry was immediately discharged from the mixer to leave to stand on a flat surface. Congelation initiated after about 30 minutes at ambient temperature (in case of about 20° C.) and completed after about 180 minutes. The congealed product was further left to stand to yield a granular solidified substance with good strength after 3 days. This was sieved by a particle classifier to yield a soil conditioner and a roadbed material (fine aggregate with a particle diameter under 5 mm).

Example 9

Solidifying and Detoxifying Treatment of Sewage Sludge (Dewatered Sludge)

Fifty kg of a sewage sludge (dewatered sludge) were adjusted a water content to 85% or less and mixed with 10 kg of a solidifying and detoxifying agent with the following composition.

Composition of Solidifying and Detoxifying Agent

| | |
|---|---|
| Light burnt magnesite (made by Sobue Clay Co., Ltd.) | 40% by weight |
| Chrysolite powder (made by Miyamori Saiseki Industry Co., Ltd.) | 40% by weight |
| Calcined lime powder (made by Tohoku Tosoh Chemical Co., Ltd.) | 20% by weight |

The mixture was then kneaded in a mixer for 3 minutes to yield a slurry. The slurry was immediately discharged from the mixer to leave to stand on a flat surface. Congelation initiated after about 30 minutes at ambient temperature (in case of about 20° C.) and completed after about 180 minutes. The congealed product was further left to stand to yield a granular solidified substance with good strength after 3 days. This was sieved by a particle classifier to yield a soil conditioner and a roadbed material (fine aggregate with a particle diameter under 5 mm).

Example 10

Solidifying and Detoxifying Treatment of Mixed Ash of Incinerated Ash Containing Heavy Metals and Fly Ash Forty kg of a solidifying and detoxifying agent with the following composition were mixed with an incinerated ash containing heavy metals such as cadmium, lead, hexavalent chromium, mercury and the like and a fly ash after adjusting a water content to a range of 85% relative to 0.2 m³ of the dried substance of the mixed ash.

| | |
|---|---|
| Light burnt magnesite (made by Sobue Clay Co., Ltd.) | 50% by weight |
| Chrysolite powder (made by Miyamori Saiseki Industry Co., Ltd.) | 30% by weight |
| Anhydrous gypsum powder (made by Sobue Clay Co., Ltd.) | 10% by weight |
| Fused phosphate fertilizer (Tohoku Tosoh Chemical Co., Ltd.) | 10% by weight |

The mixture was then kneaded in a mixer for 3 minutes to yield a slurry. The slurry was immediately discharged from the mixer to leave to stand on a flat surface. Congelation initiated after about 30 minutes at ambient temperature (in case of about 20° C.) and completed after about 180 minutes. The congealed product was further left to stand to yield a granular solidified substance with good strength after 3 days. This was sieved by a particle classifier to yield a cover soil material (for countermeasure of hydrogen sulfide in a final landfill work site) and a roadbed material (fine aggregate with a particle diameter under 5 mm).

A sample solution for an elution test of the heavy metals before and after solidifying and detoxifying treatment was prepared using an elution method of Official Notice No. 46 from the Japanese Ministry of the Environment and as the measurement object cadmium, cyan, lead, hexavalent chromium, arsine and boron were determined according to JIS K 0120, organic phosphorous was determined according to the Table 1 in Official Notice No. 64 in 1974 from the Japanese Ministry of the Environment and mercury was determined according to the Table 1 in Official Notice No 59 in 1971 from the Japanese Ministry of the Environment, respectively, the results of which are shown in Table 4 below.

TABLE 4

| | Elution Test | | |
|---|---|---|---|
| Measurement object | Before treatment (mg/L) | After treatment (mg/L) | Measurement method |
| Cadmium | 0.002 | Below 0.001 | JIS K 0102 55 |
| Cyan | 0.1 | Not detected | JIS K 0102 38 |
| Organic phosphorous | 0.1 | Not detected | Table 1 in Official Notice No. 64 in 1974 from the Japanese Ministry of the Environment |
| Lead | 0.01 | Below 0.001 | JIS K 0102 54 |
| Hexavalent chromium | 0.02 | Below 0.005 | JIS K 0102 65.2 |
| Arsine | 0.005 | Below 0.001 | JIS K 0102 61 |

TABLE 4-continued

Elution Test

| Measurement object | Before treatment (mg/L) | After treatment (mg/L) | Measurement method |
|---|---|---|---|
| Mercury | 0.0005 | Below 0.0005 | Table 1 in Official Notice No. 64 in 1974 from the Japanese Ministry of the Environment |
| Boron | 1.2 | 0.27 | JIS K 0102 47.3 |

It can be understood from Table 4 that use of the solidifying and detoxifying method in the present invention can prevent the heavy metals from elution.

Table 5 below shows the measurement results on a content of the heavy metals before and after the solidifying and detoxifying treatment according to the "Soil Test Method" in Official Notice No. 127 in 1971 from the Ministry of the Environment.

TABLE 5

Test for Residues

| Measurement object | Before treatment (mg/kg) | After treatment (mg/kg) |
|---|---|---|
| Mercury | 0.02 | 0.02 |
| Lead | 1000 | 130 |
| Hexavalent chromium | Below 2 | Below 2 |
| Arsine | 3.6 | 2.7 |
| Cyan | Below 0.1 | Below 0.1 |
| Boron | 130 | 93 |
| Selenium | Below 0.5 | Below 0.5 |

It is understood from Table 5 that measured values for lead, arsine and boron were reduced in measurement according to the "Soil Test Method" in No. 127 for Measurement of Discharged Water in Water Pollution Control Law in 1971 from the Ministry of the Environment.

Example 11

Two hundred kg of a solidifying and detoxifying agent with the following composition were mixed with 1,000 kg of a soil contaminated with an incinerated ash containing dioxins after adjusting a water content to 60 to 80%.

Composition of Solidifying and Detoxifying Agent

| | |
|---|---|
| Light burnt magnesite (made by Sobue Clay Co., Ltd.) | 25% by weight |
| Chrysolite powder (made by Miyamori Saiseki Industry Co., Ltd.) | 25% by weight |
| Fused phosphate fertilizer (Tohoku Tosoh Chemical Co., Ltd.) | 40% by weight |
| Titanium dioxide powder (Sobue Clay Co., Ltd.) | 10% by weight |

The mixture was then kneaded in a mixer for 3 minutes to yield a slurry (rate of solid content, in vicinity of 30%). The slurry was immediately discharged from the mixer to leave to stand on a flat surface. Congelation initiated after about 30 minutes at ambient temperature (in case of about 20° C.) and completed after about 180 minutes. The congealed product was further cured to yield a granular solidified substance with good strength after 3 days. This was sieved by a particle classifier to yield a roadbed material and a landfill material (for soil cover).

Table 6 shows analytical results on the measured concentration and toxicity equivalent concentration of dioxins before and after solidifying and detoxifying treatment.

TABLE 6

| Classification | Before treatment | After treatment |
|---|---|---|
| Toxicity equivalent concentration | 6.6 ng-TEQ/g | 0.78 ng-TEQ/g |

Example 12

Three percents of a detoxifying agent with the following composition is added relative to 1000 l of contaminated water containing dioxins.

Composition of Detoxifying Agent

| | |
|---|---|
| (1) Light burnt magnesite (made by Sobue Clay Co., Ltd.) | 20% by weight |
| (2) Chrysolite powder (made by Miyamori Saiseki Industry Co., Ltd.) | 20% by weight |
| (3) Light burnt dolomite (made by Sobue Clay Co., Ltd.) | 20% by weight |
| (4) Fused phosphate fertilizer (Tohoku Tosoh Chemical Co., Ltd.) | 30% by weight |
| (5) Titanium dioxide powder (Sobue Clay Co., Ltd.) | 10% by weight |

The mixture was stirred in a tank for 3 minutes to yield a flocculate (precipitate). The flocculate was filtered to separate into a filtered substance (precipitate after treatment) and filtered water (water after treatment and separation) and the filtered substance was further cured to yield a landfill material with good compaction after 3 days. The filtered water also showed a value complying within an effluent standard (10 pg-TEQ/L or less).

Table 7 shows the analytical results of the toxicity equivalent concentration of dioxins before and after treatment of polluted water containing dioxins.

TABLE 7

| Sample number | Addition rate | Object | Term | Unit | Before treatment | After treatment |
|---|---|---|---|---|---|---|
| 1 | 3% | Polluted water containing DXNs* | DXNs* | pg-TEQ/L | 260 | 0 |
| | | Filtered substance after treatment | DXNs* | ng-TEQ/g | — | 0.0036 |
| 2 | 3% | Polluted water containing DXNs* | DXNs* | pg-TEQ/L | 1,500 | 3.1 |

TABLE 7-continued

| Sample number | Addition rate | Object | Term | Unit | Before treatment | After treatment |
|---|---|---|---|---|---|---|
| | | Filtered substance after treatment | DXNs* | ng-TEQ/g | — | 0.0051 |

*Dioxins

Example 13

One percent, 3% and 5% of detoxifying agents with the following composition were added to two sets of 10 l of polluted water containing PCB.

Composition of Detoxifying Agent

| | | |
|---|---|---|
| (1) | Light burnt magnesite (made by Sobue Clay Co., Ltd.) | 20% by weight |
| (2) | Chrysolite powder (made by Miyamori Saiseki Industry Co., Ltd.) | 20% by weight |
| (3) | Light burnt dolomite (Sobue Clay Co., Ltd.) | 20% by weight |
| (4) | Fused phosphate fertilizer (Tohoku Tosoh Chemical Co., Ltd.) | 20% by weight |
| (5) | Titanium dioxide powder (Sobue Clay Co., Ltd.) | 10% by weight |
| (6) | Calcined lime powder (Tohoku Tosoh Chemical Co., Ltd.) | 10% by weight |

The mixture was stirred in a tank for 3 minutes to yield a flocculate (precipitate). The flocculate was filtered to separate into a filtered substance (precipitate after treatment) and filtered water (water after treatment and separation) and the filtered substance was further cured to yield a landfill material with good compaction after 3 days. The filtered water also showed a value complying within an effluent standard (10 pg-TEQ/L or less).

Table 8 shows the analytical results of the PCB concentration before and after treatment of polluted water containing PCB.

TABLE 8

| Sample number | Object | Amount added | Unit | PCB before treatment | PCB after treatment |
|---|---|---|---|---|---|
| 1 | Polluted water containing PCB | 1% | mg/L | 0.0005 | 0.00035 |
| 2 | Polluted water containing PCB | 3% | mg/L | 0.0005 | 0.00034 |
| 3 | Polluted water containing PCB | 5% | mg/L | 0.0005 | 0.00035 |
| 4 | Polluted water containing PCB | 1% | mg/L | 0.0040 | 0.00045 |
| 5 | Polluted water containing PCB | 3% | mg/L | 0.0040 | 0.00046 |
| 6 | Polluted water containing PCB | 5% | mg/L | 0.0040 | 0.00045 |

EFFECT OF THE INVENTION

The solidifying and detoxifying agent and the solidifying and detoxifying method in the present invention can yield a very hard solidified substance, which is detoxified to a level satisfying the environmental standards according to Official Notice No. 46 from the Japanese Ministry of the Environment. Said solidified substance shows a low pH value in the vicinity of 10.0 and has little pollution load by alkali.

The solidified substance obtained by application of the solidifying and detoxifying agent in the present invention becomes a granular solidified substance with good strength in 3 to 6 days, enabling to recycle as a soil conditioner, a roadbed material and the like.

The solidified substance obtained by applying the solidifying and detoxifying agent of the present invention has a porous component and contains aluminum oxide, so that useful microorganisms contained in polluted water is favorably absorbed by the aluminum oxide to decompose organic substances, thus allowing application to clean polluted water.

When the solidifying and detoxifying agent of the present invention contains both fused phosphate fertilizer and titanium dioxide powder, an oil content, heavy metals, dioxins and the like in a soil can be solidified and detoxified or decomposed and detoxified, thus providing effective pollution control.

What is claimed is:

1. A solidifying and detoxifying agent of
   (1) light burnt magnesite,
   (2) chrysolite powder,
   (3) fused phosphate fertilizer, and
   (4) titanium dioxide powder,
   wherein a ratio by weight of the component (1) and the component (2) is 1:5 to 5:1,
   component (3) is 1 to 50 parts by weight relative to 100 parts by weight of a sum of the component (1) and the component (2),
   component (4) is 1 to 50 parts by weight relative to 100 parts by weight of a sum of the component (1), the component (2) and the component (3), and the solidifying and detoxifying agent is applied to one kind of processed substances selected from soil, incinerated ash and coal ash.

2. A solidifying and detoxifying agent according to claim 1, comprising
   (5) light burnt dolomite
   wherein the component (5) is 1 to 50 parts by weight relative to 100 parts by weight of a sum of the component (1) and the component (2), and the components (3) and (4) are 1 to 50 parts by weight relative to 100 parts by weight of a sum of the component (1), the component (2) and the component (5), and the solidifying and detoxifying agent is applied to one kind of processed substances selected from soil, incinerated ash and coal ash.

3. A solidifying and detoxifying agent according to claim 1, comprising
   (5) light burnt dolomite
   wherein the component (5) is 1 to 50 parts by weight relative to 100 parts by weight of a sum of the component (1) and the component (2), and the components (3) and (4) are 60 to 100 parts by weight relative to 100 parts by weight of a sum of the component (1), the component (2) and the component (5), and the solidifying and detoxifying agent is applied to one kind selected from soil contaminated with heavy metals, soil contaminated with dioxins, incinerated ash containing dioxins and general incinerated ash.

4. A solidifying and detoxifying agent according to claim 1, wherein the soil described above is inorganic soil, organic soil or soil contaminated with oil (including benzene).

5. A detoxifying agent of
(1) light burnt magnesite,
(2) chrysolite powder,
(3) light burnt dolomite,
(4) fused phosphate fertilizer and
(5) titanium dioxide powder,
wherein a ratio by weight of the component (1) and the component (2) is 1:5 to 5:1 and the component (3), the component (4) and the component (5) are 1 to 30 parts by weight, 1 to 50 parts by weight and 1 to 30 parts by weight, respectively, relative to 100 parts by weight of a sum of the component (1) and the component (2) and the detoxifying agent is applied to a processed substance of polluted water containing dioxins.

6. A detoxifying agent of
(1) light burnt magnesite,
(2) chrysolite powder,
(3) light burnt dolomite,
(4) fused phosphate fertilizer and
(5) titanium dioxide powder,
wherein a ratio by weight of the component (1) and the component (2) is 1:5 to 5:1 and the component (3) and the component (4) are 1 to 30 parts by weight and 1 to 50 parts by weight, respectively, relative to 100 parts by weight of a sum of the component (1) and the component (2), and the component (5) is 10 to 50 parts by weight relative to 100 parts by weight of a sum of the component (1), the component (2), the component (3) and the component (4) and the detoxifying agent is applied to polluted water containing dioxins.

7. A detoxifying agent of
(1) light burnt magnesite,
(2) chrysolite powder,
(3) light burnt dolomite,
(4) fused phosphate fertilizer,
(5) titanium dioxide powder and
(6) calcined lime powder,
wherein a ratio by weight of the component (1) and the component (2) is 1:5 to 5:1 and the component (3), the component (4), the component (5) and the component (6) are 1 to 30 parts by weight and 1 to 50 parts by weight, 1 to 30 parts by weight and 1 to 30 parts by weight, respectively, relative to 100 parts by weight of a sum of the component (1) and the component (2) and the detoxifying agent is applied to a processed substance of polluted water containing PCB.

8. A detoxifying agent of
(1) light burnt magnesite,
(2) chrysolite powder,
(3) light burnt dolomite,
(4) fused phosphate fertilizer,
(5) titanium dioxide powder and
(6) calcined lime powder,
wherein a ratio by weight of the component (1) and the component (2) is 1:5 to 5:1 and the component (3), the component (4) and the component (5) are 1 to 30 parts by weight and 1 to 50 parts by weight and 1 to 30 parts by weight, respectively, relative to 100 parts by weight of a sum of the component (1) and the component (2), and the component (6) is 10 to 50 parts by weight relative to 100 parts by weight of a sum of the component (1), the component (2), the component (3), the component (4) and the component (5) and the detoxifying agent is applied to a polluted water containing PCB.

9. A solidifying and detoxifying method having features of
(1) mixing 50 to 200 kg of the solidifying and detoxifying agent according to claim 1 with 1,000 kg of one kind of processed substances selected from soil after adjusting a water content to 60 to 80% by weight or mixing 50 to 200 kg of the solidifying and detoxifying agent with one kind of processed substances selected from incinerated ash or coal ash after adjusting a water content to 60 to 80% by weight relative to 1 $m^3$ of said processed substance,
(2) kneading to yield a kneaded product in a form of slurry and
(3) naturally drying or forcefully drying said kneaded product to yield a solidified substance converted to particulates.

10. A solidifying and detoxifying method having features of
(1) mixing 50 to 200 kg of the solidifying and detoxifying agent according to claim 2 with 1,000 kg of one kind of processed substances selected from soil after adjusting a water content to 60 to 80% by weight or mixing 50 to 200 kg of the solidifying and detoxifying agent with one kind of processed substances selected from incinerated ash or coal ash after adjusting a water content to 60 to 80% by weight relative to $m^3$ of said processed substance,
(2) kneading to yield a kneaded product in a form of slurry and
(3) naturally drying or forcefully drying said kneaded product to yield a solidified substance converted to particulates.

11. A solidifying and detoxifying method having features, by
(1) mixing 50 to 500 kg of the solidifying and detoxifying agent according to claim 3 with 1,000 kg of one kind of processed substances selected from soil contaminated with heavy metals and soil contaminated with dioxins after adjusting a water content to 60 to 80% by weight or mixing 50 to 500 kg of the solidifying and detoxifying agent with one kind of processed substances selected from incinerated ash containing dioxins and general incinerated ash after adjusting a water content to 60 to 80% by weight relative to 1 $m^3$ of said processed substance,
(2) kneading to yield a kneaded product in a form of slurry and
(3) naturally drying or forcefully drying said kneaded product to yield a solidified substance converted to particulates.

12. A detoxifying method having features of
(1) adding 1 to 3% of the detoxifying agent according to claim 5 relative to 1,000 L of polluted water containing dioxins to stir,
(2) congealing to yield a flocculate and
(3) filtering to separate into a filtered product (precipitate) and filtered water (water after treatment) and curing the filtered product to yield a solidified substance for a sand-like material.

13. A detoxifying method having features of
(1) adding 1 to 5% of the detoxifying agent according to claim 7 relative to 1,000 L of polluted water containing PCB to stir,
(2) congealing to yield a flocculate and
(3) filtering to separate into a filtered product (precipitate) and filtered water (water after treatment) and curing the filtered product to yield a solidified substance for a sand-like material.

* * * * *